US006182953B1

United States Patent
Smith et al.

(10) Patent No.: US 6,182,953 B1
(45) Date of Patent: Feb. 6, 2001

(54) SPRING AND STRUT MODULE WITH RESTRAINT FOR STRUT BUMPER

(75) Inventors: Mark C. Smith, Troy; Slawomir J. Herman, Rochester, both of MI (US)

(73) Assignee: Chrysler Corporation, Auburn Hills, MI (US)

(*) Notice: Under 35 U.S.C. 154(b), the term of this patent shall be extended for 0 days.

(21) Appl. No.: 09/159,162

(22) Filed: Sep. 23, 1998

(51) Int. Cl.⁷ .................................................. B60G 13/00
(52) U.S. Cl. ....................... 267/220; 267/33; 188/321.11
(58) Field of Search ......................... 188/321.11, 322.22, 188/297; 267/64.11, 33, 153, 217, 220, 292, 293, 294; 280/124.177, 124.175

(56) References Cited

U.S. PATENT DOCUMENTS

| | | | |
|---|---|---|---|
| 4,256,292 | 3/1981 | Sullivan, Jr. et al. ................... 267/8 |
| 4,434,977 | 3/1984 | Chiba et al. ............................ 267/33 |
| 4,474,363 | 10/1984 | Numazawa .............................. 267/34 |
| 4,482,135 | 11/1984 | Ishida et al. ............................ 267/8 |
| 4,711,463 | * 12/1987 | Knable et al. ......................... 280/668 |
| 4,721,325 | 1/1988 | Mackovjak et al. .................. 280/668 |
| 5,009,401 | * 4/1991 | Weitzenhof ....................... 267/64.21 |
| 5,112,077 | 5/1992 | Makita ................................. 280/673 |
| 5,120,031 | 6/1992 | Charles et al. ........................ 267/220 |
| 5,131,628 | * 7/1992 | Hein et al. ............................ 267/220 |
| 5,192,057 | 3/1993 | Wydra et al. ........................ 267/153 |
| 5,275,389 | * 1/1994 | Pinch et al. .......................... 267/220 |
| 5,467,971 | * 11/1995 | Hurtubise et al. .................... 267/220 |

* cited by examiner

Primary Examiner—Matthew C. Graham
Assistant Examiner—Pamela J. Lipka
(74) Attorney, Agent, or Firm—Lawrence J. Shurupoff

(57) ABSTRACT

A spring and strut mount assembly for an automotive vehicle including a strut in the form of a shock absorber having a piston reciprocable within a cylinder, and a piston rod extending axially outwardly from the piston through a cap on an end of the cylinder. The assembly also includes a strut mount adapted to be secured to rigid frame structure of the vehicle. The piston rod is secured to the strut mount. A spring unit resists retraction of the piston rod into the cylinder. A jounce bumper of flexible compressible material is sleeved on the rod between the strut mount and the end of the cylinder. The jounce bumper is compressed axially by contact with the end of the cylinder when the piston rod strokes. A cup is provided to limit radially outward expansion of the jounce bumper when it is compressed by the end of the cylinder. The cup includes a side wall of plastic material surrounding the jounce bumper. The base of the cup is a metal washer.

2 Claims, 2 Drawing Sheets ed end portion forming a strut...

SPRING AND STRUT MODULE WITH RESTRAINT FOR STRUT BUMPER

This invention relates generally to a spring and strut module for an automotive vehicle, and more particularly to a cup for restraining the expansion of a bumper on a strut.

BACKGROUND AND SUMMARY OF THE INVENTION

A spring and strut module typically includes a strut and a spring unit between the brake and knuckle module of a wheel assembly and the frame of the vehicle. The strut incorporates a shock absorber which has a piston reciprocable in a cylinder. The piston has a rod secured to a strut mount which is bolted to the frame of the vehicle. The spring unit includes a spring which resists retraction of the piston. A resilient jounce bumper sleeved on the piston rod also resists retraction of the piston. When the piston retracts, the end of the cylinder sometimes contacts the jounce bumper. This axially compresses the jounce bumper and causes it to expand radially outwardly. Such expansion causes cracking of the jounce bumper and shortens its effective life. What is needed is something to reduce if not altogether eliminate radial expansion of the jounce bumper.

In accordance with the invention, a restraining member preferably in the form of a cup is attached to the piston rod, the cup having a side wall which surrounds the jounce bumper. The wall of the cup confines the jounce bumper and permits only a limited radially outward expansion thereof.

More specifically, the base of the cup is closed by a hardened steel washer which is secured to the side wall of the cup by a press fit. In time, this press fit may loosen. A resilient abutment carried by the strut mount keeps the side wall and washer from separating.

One object of this invention is to provide a spring and strut module having a cup for limiting radial expansion of the jounce bumper, having the foregoing features and capabilities.

Another object is to provide a jounce bumper and cup which are rugged and durable in use and capable of being inexpensively manufactured.

These and other objects features and advantages of the invention will become more apparent as the following description proceeds, especially when considered with the accompanying drawings.

DETAILED DESCRIPTION OF THE PREFERRED EMBODIMENT

Figure 1:
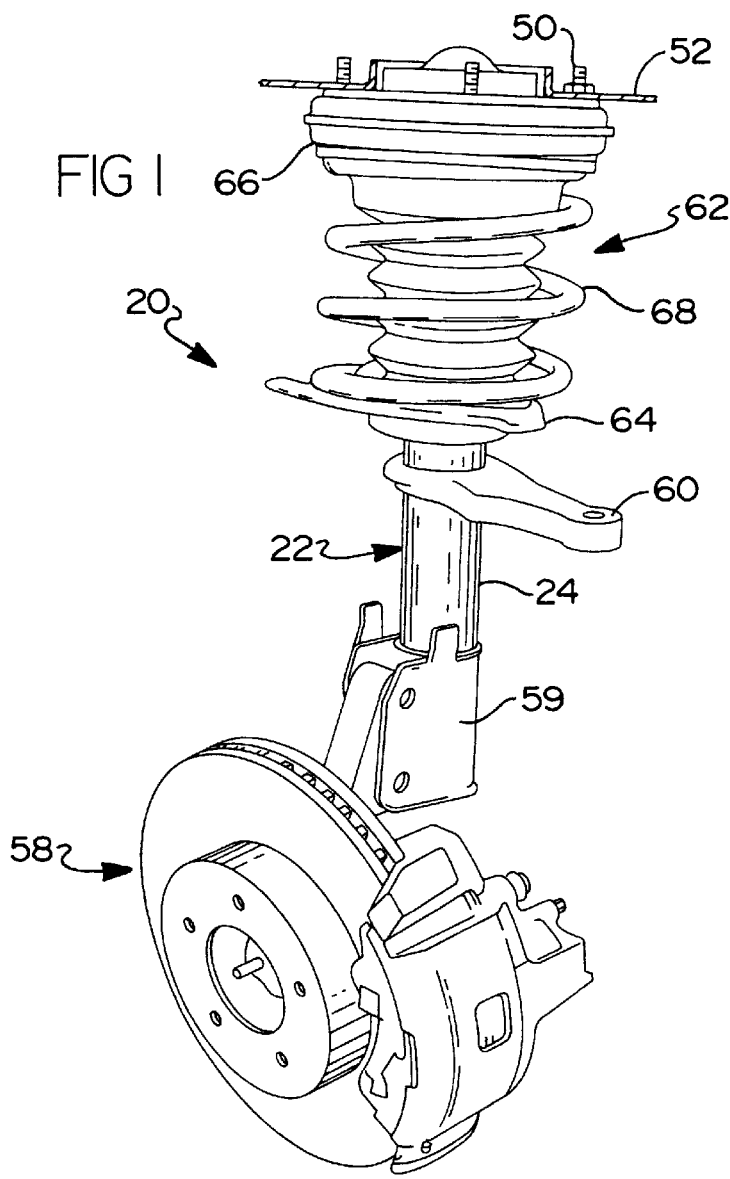
FIG. 1 is a perspective view of a spring and strut module and also showing a brake and knuckle module connected thereto.
Figure 3:
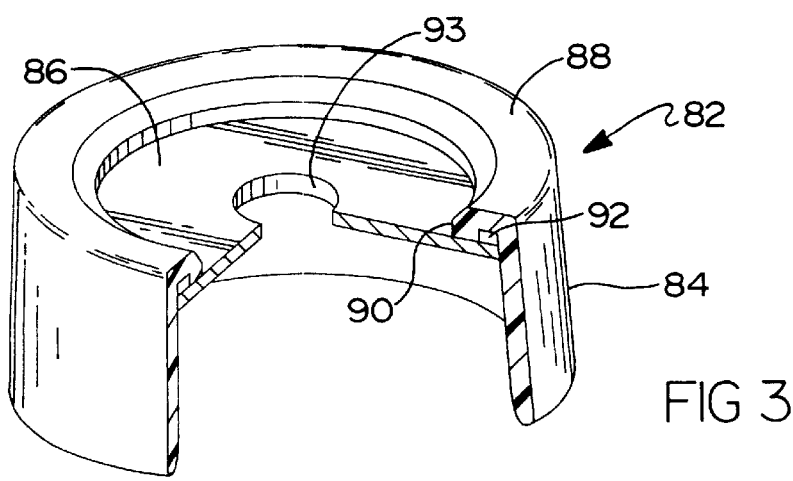
FIG. 3 is a perspective view of the cup.

Referring now more particularly to the drawings, there is shown a spring and strut module 20 including a strut in the form of a shock absorber 22 having a piston 23 reciprocable in a cylinder 24. The piston has a rod 26 which extends through an opening in a cap 28 closing the upper end of the cylinder. The rod 26 has a reduced end portion forming a bolt 29 which extends through a hole in a center plate 30 of a strut mount 32 and is secured to the center plate by a nut 34 threaded on the bolt 29. The center plate 30 is secured to an outer ring plate 38 of the strut mount 32 by a resilient ring 40. The outer ring plate 38 is secured to an annular cover plate 42 of the strut mount. The cover plate 42 has a circular series of bolts 50 for securing the strut mount 32 to a fixed frame member 52 of a rigid vehicle support structure. The frame member 52 has a series of bolt holes to receive the bolts 50.

An elongated tubular jounce bumper 54 of rubber or like resilient, flexible compressible material is sleeved on the rod 26 between the center plate 30 of the strut mount 32 and the cap 28 of the cylinder 24. The jounce bumper 54 has a plurality of axially spaced, external annular grooves 56. The inner surface of the jounce bumper fits tightly on the rod 26 and at its end adjacent the cylinder cap 28 has a pair of axially spaced internal annular grooves 57. The lower end of the jounce bumper is engaged by the cap 28 on the upper end of the cylinder 24 when the piston 23 of the shock absorber strokes and the rod 26 moves into the cylinder, to axially compress the jounce bumper and impart a cushioning action. The bumper gradually increases resistance to the retraction of piston 23 as the bumper is compressed.

A brake and knuckle module 58 is secured to the lower end of the cylinder 24 of the shock absorber 22 by a bracket 59. A steering arm 60 has one end secured to the cylinder 24.

The spring and strut module 20 includes a spring unit for resisting retraction of the piston rod 26 into the cylinder 24. The spring unit includes a bearing and spring seat assembly 62. The bearing and spring seat assembly has an annular lower spring seat 64 which is secured to the cylinder 24 intermediate its ends as by welding, and an annular upper spring seat 66. A coil spring 68 encircles the shock absorber, its lower end being seated on an isolator 69 carried by the lower spring seat 64 and its upper end seated on an isolator 70 carried by the upper spring seat 66.

An annular ball bearing unit 74 rotatably supports the outer ring plate 38 of the strut mount 32 on the upper spring seat 66. A tubular dust shield 80 surrounds the shock absorber 22 with its ends gripped between the upper and lower spring seats and the associated isolators.

As previously stated, when the piston 23 retracts into the cylinder 24 of the shock absorber, the piston rod 26 moves into the cylinder and the jounce bumper 54 carried by the rod 26 is compressed against the cap 28 on the end of the cylinder. In order to limit axially outward expansion of the jounce bumper when it is thus compressed, a restraining member in the form of a cup 82 is provided.

The cup 82 comprises an annular side wall 84 and a circular metal washer 86 of steel, for example. The side wall is preferably made of a suitable plastic material such as Nylon and has one end formed with a radially inturned annular flange 88 defining a central opening 90. The metal washer 86 forms the base of the cup, closing the central opening 90 and is axially seated on the annular flange 88 within the annular side wall. Preferably, the metal washer is secured to the side wall in a press fit. The washer is inserted into the open end of the side wall 84 and pressed down upon the annular flange 88. The annular flange 88 has a concentric annular trough 92 inside the cup and adjacent to the side wall for accommodating material shaved from the inner surface of the side wall when the washer is inserted into the side wall and pressed down upon the annular flange. The side wall 84 of the cup preferably flares radially outwardly in a direction away from the base to facilitate initial entry of the washer during assembly of the cup.

The bolt 29 on the end of the piston rod extends through a center hole 93 in the washer 86. The washer is clamped between the upper end of the piston and the center plate 30 of the strut, with the side wall 84 of the cup extending downwardly along the upper portion of the jounce bumper 54. In this position, the washer is perpendicular to the rod 26 and the side wall is concentric with both the rod 26 and the jounce bumper.

An abutment ring 100 of resilient, flexible compressible material such as rubber is secured to the center plate 30 of the strut mount 32 and engages the annular flange 88 of the side wall 84, holding the side wall down against the metal washer 86 and thereby preventing the washer and side wall from separating even if the press fit between the side wall and the washer becomes loosened as it sometimes does after repeated stroking of the piston 23 in the cylinder 24 of the shock absorber.

Figure 2:
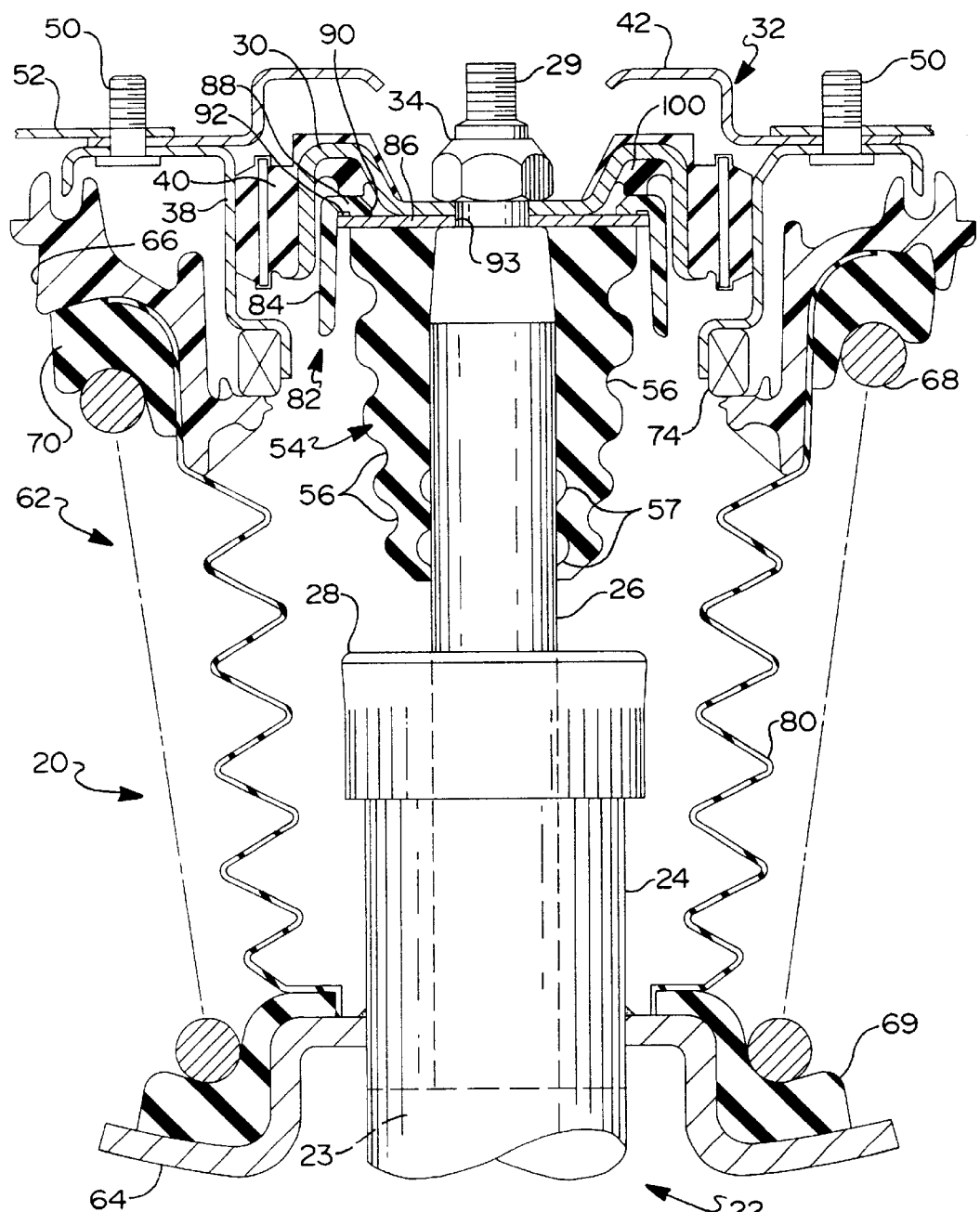
FIG. 2 is a enlarged fragmentary sectional view of the upper portion of the spring and strut module, showing the jounce bumper and cup of this invention.

The stroking of the piston is sometimes so extreme that the jounce bumper compresses substantially more than half its axial length and this creates a radial expansion of the jounce bumper. In some instances the cap 28 on the upper end of the cylinder may enter the cup and for this reason the cup side wall has an inside diameter somewhat larger than the cap and has a radially outward flare. As seen in FIG. 2, the side wall of the cup closely surrounds the upper portion of the jounce bumper and thereby confines it and limits the amount of radial expansion of the jounce bumper when it is compressed. By thus limiting the radial expansion of the jounce bumper, the jounce bumper is less likely to crack and/or fail after repeated stroking of the piston.

What is claimed is:

1. A spring and strut mount assembly for an automotive vehicle comprising a strut having a shock absorber including a piston reciprocable within a cylinder, said piston having a piston rod extending axially outwardly from an end of said cylinder, a strut mount adapted to be secured to a rigid frame of the vehicle, means securing said piston rod to said strut mount, a spring unit resisting retraction of the piston rod inwardly of the cylinder, a jounce bumper of flexible compressible material sleeved on said rod between said strut mount and said end of said cylinder and adapted to be compressed axially by contact with the end of said cylinder when the piston rod is retracted inwardly of said cylinder, a restraining member carried by said rod and surrounding said jounce bumper to limit radially outward expansion of the jounce bumper when the jounce bumper is compressed by the end of the cylinder;

wherein said restraining member is in the form of a cup having an annular side wall generally concentric with said rod, and said cup has a base secured to said rod;

wherein said side wall is made of plastic material and has one end formed with a radially inturned annular flange defining a central opening, and said base comprises a metal washer closing said central opening and seated on said annular flange within the annular side wall;

wherein said metal washer is peripherally secured to the side wall in a press fit; and wherein said annular flange has an annular trough adjacent to the side wall for accommodating material shaved from said side wall when said washer is inserted into the side wall and secured thereto in said press fit.

2. A spring and strut mount assembly for an automotive vehicle comprising a strut having a shock absorber including a piston reciprocable within a cylinder, said piston having a piston rod extending axially outwardly from an end of said cylinder, a strut mount adapted to be secured to a rigid frame of the vehicle, means securing said piston rod to said strut mount, a spring unit resisting retraction of the piston rod inwardly of the cylinder, a jounce bumper of flexible compressible material sleeved on said rod between said strut mount and said end of said cylinder and adapted to be compressed axially by contact with the end of said cylinder when the piston rod is retracted inwardly of said cylinder, and a restraining member carried by said rod and surrounding said jounce bumper to limit radially outward expansion of the jounce bumper when the jounce bumper is compressed by the end of the cylinder;

wherein said restraining member has a side wall and a base surrounding said rod;

wherein said side wall has one end formed with a radially inturned annular flange, and said base comprises a washer seated on said annular flange within the annular side wall; and wherein said annular flange defines an annular trough adjacent to the side wall for accommodating material shaved from said side wall when said washer is inserted into the side wall and secured thereto.

\* \* \* \* \*